United States Patent
Wada et al.

(10) Patent No.: US 11,487,462 B2
(45) Date of Patent: Nov. 1, 2022

(54) METHOD AND DEVICE OF PREDICTING INTER-VOLUME COPY TIME BASED ON INTER-POOL COPY SPEED

(71) Applicant: Hitachi, Ltd., Tokyo (JP)

(72) Inventors: Kiyomi Wada, Tokyo (JP); Akira Deguchi, Tokyo (JP); Mineyoshi Masuda, Tokyo (JP); Shinichi Hayashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/194,648

(22) Filed: Mar. 8, 2021

(65) Prior Publication Data

US 2021/0405905 A1    Dec. 30, 2021

(30) Foreign Application Priority Data

Jun. 30, 2020    (JP) .............................. JP2020-112804

(51) Int. Cl.
*G06F 3/06* (2006.01)

(52) U.S. Cl.
CPC .............. *G06F 3/065* (2013.01); *G06F 3/061* (2013.01); *G06F 3/0683* (2013.01)

(58) Field of Classification Search
CPC ...... G06F 3/0601; G06F 3/065; G06F 3/0683; G06F 3/0647–0649
See application file for complete search history.

(56) References Cited

U.S. PATENT DOCUMENTS

2015/0201013 A1*  7/2015  Nonaka ............... H04L 67/1095
                                                            709/217
2016/0357464 A1   12/2016  Suzuki et al.

FOREIGN PATENT DOCUMENTS

WO    WO 2015/198440 A1   12/2015

* cited by examiner

*Primary Examiner* — Chie Yew
(74) *Attorney, Agent, or Firm* — Baker Botts L.L.P.

(57) ABSTRACT

An inter-volume copy time is to be accurately predicted. An operation management system is configured to perform operation management on a storage device including a plurality of resources and a plurality of volumes. In the storage device, IO processing and copy processing are performed between a plurality of volume groups in which the plurality of volumes are collected. The operation management system includes a processor, and the processor is configured to predict an inter-pool copy speed between the plurality of volume groups belonging to a same resource pool in the storage device, and predict an inter-volume copy time based on the predicted inter-pool copy speed.

12 Claims, 19 Drawing Sheets

FIG. 7

INTER-LDEV COPY OPERATION TABLE (714)
- 715: DATE AND TIME
- 716: PRIMARY LDEV NAME
- 717: SECONDARY LDEV NAME
- 718: OPERATION (COPY START AND COPY END)

INTER-LDEV COPY STATE TABLE (719)
- 720: DATE AND TIME
- 721: PRIMARY LDEV NAME
- 722: SECONDARY LDEV NAME
- 723: STATE (COPY ON AND COPY OFF)
- 724: INTER-LDEV DIFFERENCE AMOUNT

LDEV IOPS TABLE (725)
- 726: DATE AND TIME
- 727: LDEV NAME
- 728: IOPS

LDEV C2D NUMBER OF TIMES TABLE (729)
- 730: DATE AND TIME
- 731: LDEV NAME
- 732: CACHE TO DRIVE NUMBER OF TIMES

PG RESOURCE TABLE (733)
- 734: DATE AND TIME
- 735: PG NAME
- 736: PG OPERATION RATE

CLPR RESOURCE TABLE (737)
- 738: DATE AND TIME
- 739: CLPR NAME_ALLOCATED MPU NAME
- 740: WRITE PENDING RATE

MPU RESOURCE TABLE (741)
- 742: DATE AND TIME
- 743: MPU NAME
- 744: MPU OPERATION RATE

FIG. 8

IOPS w/o COPY PREDICTION MODEL TABLE
- 801 — IOPS w/o COPY PREDICTION MODEL TABLE
- 802 — START DATE AND TIME
- 803 — END DATE AND TIME
- 804 — LDEV NAME
- 805 — IOPS w/o COPY PREDICTION FUNCTION

IOPS w/COPY PREDICTION MODEL TABLE
- 806 — IOPS w/COPY PREDICTION MODEL TABLE
- 807 — START DATE AND TIME
- 808 — END DATE AND TIME
- 809 — LDEV NAME
- 810 — IOPS w/COPY PREDICTION FUNCTION

PG PREDICTION MODEL TABLE
- 811 — PG PREDICTION MODEL TABLE
- 812 — START DATE AND TIME
- 813 — END DATE AND TIME
- 814 — PG NAME
- 815 — PG OPERATION RATE PREDICTION FUNCTION

CLPR PREDICTION MODEL TABLE
- 816 — CLPR PREDICTION MODEL TABLE
- 817 — START DATE AND TIME
- 818 — END DATE AND TIME
- 819 — CLPR NAME_ALLOCATED MPU NAME
- 820 — WRITE PENDING RATE PREDICTION FUNCTION

MPU PREDICTION MODEL TABLE
- 821 — MPU PREDICTION MODEL TABLE
- 822 — START DATE AND TIME
- 823 — END DATE AND TIME
- 824 — MPU NAME
- 825 — MPU OPERATION RATE PREDICTION FUNCTION

IN-POOL PAIR NUMBER PREDICTION MODEL TABLE
- 826 — IN-POOL PAIR NUMBER PREDICTION MODEL TABLE
- 827 — START DATE AND TIME
- 828 — END DATE AND TIME
- 829 — POOL NAME
- 830 — PAIR NUMBER PREDICTION FUNCTION

INTER-POOL DIFFERENCE AMOUNT PREDICTION MODEL TABLE
- 831 — INTER-POOL DIFFERENCE AMOUNT PREDICTION MODEL TABLE
- 832 — START DATE AND TIME
- 833 — END DATE AND TIME
- 834 — PRIMARY POOL NAME
- 835 — SECONDARY POOL NAME
- 836 — DIFFERENCE AMOUNT PREDICTION FUNCTION

INTER-POOL COPY SPEED PREDICTION MODEL TABLE
- 837 — INTER-POOL COPY SPEED PREDICTION MODEL TABLE
- 838 — PRIMARY POOL NAME
- 839 — SECONDARY POOL NAME
- 840 — INTER-POOL COPY SPEED PREDICTION FUNCTION

FIG. 9

INTER-LDEV COPY PERFORMANCE TABLE

- 901 — INTER-LDEV COPY PERFORMANCE TABLE
- 902 — DATE AND TIME
- 903 — PRIMARY LDEV NAME
- 904 — PRIMARY POOL NAME
- 905 — SECONDARY LDEV NAME
- 906 — SECONDARY POOL NAME
- 907 — IOPS w/o COPY OF PRIMARY LDEV
- 908 — IOPS w/COPY OF PRIMARY LDEV
- 909 — NUMBER OF TIMES OF C2D OF SECONDARY LDEV
- 910 — COPY IOPS OF SECONDARY LDEV
- 911 — INTER-LDEV DIFFERENCE AMOUNT

INTER-POOL COPY PERFORMANCE TABLE

- 912 — INTER-POOL COPY PERFORMANCE TABLE
- 913 — DATE AND TIME
- 914 — PRIMARY POOL NAME
- 915 — SECONDARY POOL NAME
- 916 — INTER-POOL PAIR NUMBER
- 917 — INTER-POOL DIFFERENCE AMOUNT

INTER-POOL COPY SPEED LEARNING TABLE

- 918 — INTER-POOL COPY SPEED LEARNING TABLE
- 919 — DATE AND TIME
- 920 — PRIMARY POOL NAME
- 921 — SECONDARY POOL NAME
- 922 — IOPS w/o COPY OF LDEV GROUP IN PRIMARY POOL
- 923 — IOPS w/COPY OF LDEV GROUP IN PRIMARY POOL
- 924 — INTER-POOL PAIR NUMBER
- 925 — INTER-POOL DIFFERENCE AMOUNT
- 926 — NUMBER OF TIMES OF C2D OF LDEV GROUP IN SECONDARY POOL
- 927 — COPY IOPS OF LDEV GROUP IN SECONDARY POOL
- 928 — WPR OF PRIMARY CLPR_MPU 10
- 929 — WPR OF PRIMARY CLPR_MPU 21
- 930 — OPERATION RATE OF MPU 21 ... OPERATION RATE OF PRIMARY PG

INTER-POOL COPY SPEED PREDICTION TABLE

- 931 — INTER-POOL COPY SPEED PREDICTION TABLE
- 932 — DATE AND TIME
- 933 — PRIMARY POOL NAME
- 934 — SECONDARY POOL NAME
- 935 — IOPS w/o COPY (PREDICTED) OF LDEV GROUP IN PRIMARY POOL
- 936 — IOPS w/COPY (PREDICTED) OF LDEV GROUP IN PRIMARY POOL
- 937 — INTER-POOL PAIR NUMBER (PREDICTED)
- 938 — INTER-POOL DIFFERENCE AMOUNT (PREDICTED)
- 939 — WPR (PREDICTED) OF PRIMARY CLPR_MPU 10
- 940 — WPR (PREDICTED) OF PRIMARY CLPR_MPU 21 ... OPERATION RATE (PREDICTED) OF MPU 10
- 941 — OPERATION RATE (PREDICTED) OF MPU 21 ... OPERATION RATE (PREDICTED) OF PRIMARY PG

FIG. 10

IOPS PREDICTION TABLE — 942
- 943 DATE AND TIME
- 944 LDEV NAME
- 945 IOPS

PG PREDICTION TABLE — 946
- 947 DATE AND TIME
- 948 PG NAME
- 949 PG OPERATION RATE

CLPR PREDICTION TABLE — 950
- 951 DATE AND TIME
- 952 CLPR NAME_ALLOCATED MPU NAME
- 953 WPR

MPU PREDICTION TABLE — 954
- 955 DATE AND TIME
- 956 MPU NAME
- 957 MPU OPERATION RATE

IN-POOL PAIR NUMBER PREDICTION TABLE — 958
- 959 DATE AND TIME
- 960 PRIMARY POOL NAME
- 961 SECONDARY POOL NAME
- 962 INTER-POOL PAIR NUMBER

INTER-POOL DIFFERENCE AMOUNT PREDICTION TABLE — 963
- 964 DATE AND TIME
- 965 PRIMARY POOL NAME
- 966 SECONDARY POOL NAME
- 967 INTER-POOL DIFFERENCE AMOUNT

PREDICTED INTER-POOL COPY SPEED TABLE — 968
- 969 DATE AND TIME
- 970 PRIMARY POOL NAME
- 971 SECONDARY POOL NAME
- 972 PREDICTED INTER-POOL COPY SPEED (UPPER LIMIT)
- 973 PREDICTED INTER-POOL COPY SPEED (LOWER LIMIT)
- 974 MEASURED INTER-POOL COPY SPEED
- 975 (COPY IOPS OF LDEV GROUP IN SECONDARY POOL)
- 976 IN/OUT OF PREDICTION RANGE RANGE

INTER-LDEV COPY TIME TABLE — 977
- 978 COPY START TIME POINT
- 979 COPY END TIME POINT
- 980 INTER-LDEV COPY TIME
- 981 PRIMARY LDEV NAME
- 982 SECONDARY LDEV NAME

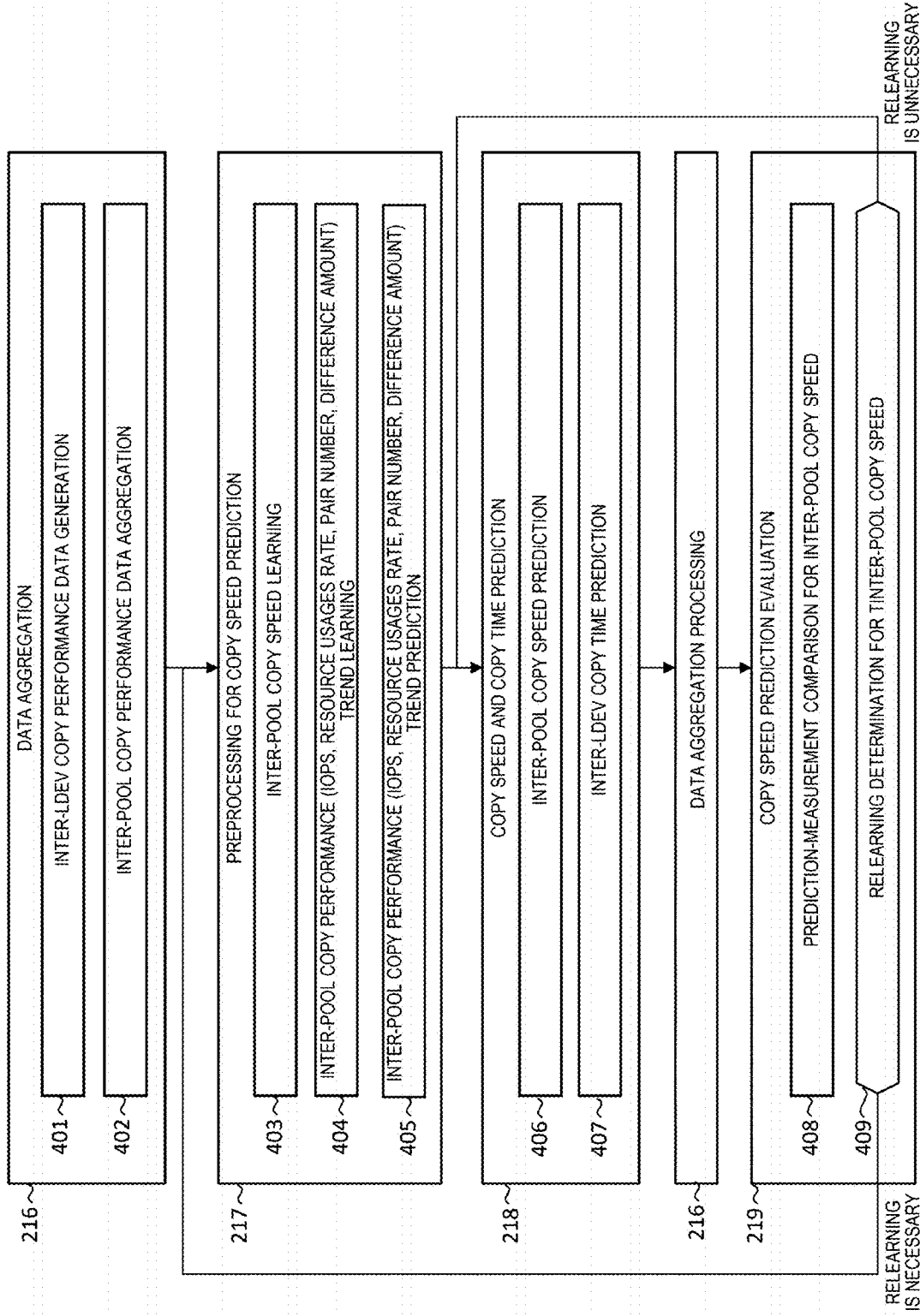

FIG. 19

| | INTER-LDEV COPY TIME DISPLAY TABLE |
|---|---|
| 1701 | |
| 1702 | OPERATION |
| 1703 | PRIMARY VOLUME |
| 1704 | SECONDARY VOLUME |
| 1705 | CAPACITY |
| 1706 | MATCHING RATE |
| 1707 | DIFFERENCE AMOUNT (MEASURED) |
| 1708 | DIFFERENCE AMOUNT (PREDICTED) |
| 1709 | START TIME POINT |
| 1710 | SCHEDULED END TIME POINT |
| 1711 | SCHEDULED REQUIRED TIME |

| | INTER-POOL COPY SPEED DISPLAY TABLE |
|---|---|
| 1712 | |
| 1713 | DATE AND TIME |
| 1714 | PRIMARY POOL NAME |
| 1715 | SECONDARY POOL NAME |
| 1716 | IOPS w/o COPY OF LDEV GROUP IN PRIMARY POOL |
| 1717 | IOPS w/COPY OF LDEV GROUP IN PRIMARY POOL |
| 1718 | INTER-POOL PAIR NUMBER |
| 1719 | INTER-POOL DIFFERENCE AMOUNT |
| 1720 | PREDICTED INTER-POOL COPY SPEED |
| 1721 | PREDICTED INTER-POOL COPY SPEED (UPPER LIMIT) |
| 1722 | PREDICTED INTER-POOL COPY SPEED (LOWER LIMIT) |
| 1723 | MEASURED INTER-POOL COPY SPEED (COPY IOPS OF LDEV GROUP IN SECONDARY POOL) |
| 1724 | IN/OUT OF PREDICTION RANGE |
| 1725 | PRIMARY CLPR NAME |
| 1726 | WRITE PENDING RATE |
| 1727 | MPU NAME |
| 1728 | MPU OPERATION RATE |
| 1729 | PRIMARY PG NAME |
| 1730 | PRIMARY PG OPERATION RATE |

METHOD AND DEVICE OF PREDICTING INTER-VOLUME COPY TIME BASED ON INTER-POOL COPY SPEED

BACKGROUND OF THE INVENTION

1. Field of the Invention

The present invention relates to an operation management device and an operation management method.

2. Description of the Related Art

The invention relates to a technique of collecting and analyzing operation information, configuration information, and the like of a storage, speeding up and facilitating storage maintenance and trouble handling, and more particularly, to a technique of predicting workload processing performance and replication performance for a large amount of logical devices (volumes) in a storage device before adding or changing a workload or changing a system configuration, pre-verifying a countermeasure plan for a performance delay, and handling a proactive failure.

There is a demand for a reduction in operation management cost of a large-scale system and an improvement in availability of a rapid countermeasure when in trouble. From such a background, attention is paid to functions of collecting and analyzing the operation information, the configuration information, and the like of the storage, and speeding up and facilitating the storage maintenance and the trouble handling. Among these, use of a data protection function causes problems of a longer copy time and a resource overload when using a copy function.

A technique is disclosed in WO 2015/198440 (Patent Literature 1) in connection with the above-described technique. In the technique disclosed in Patent Literature 1, since product data is copied to and used in a development environment, it is determined whether a time zone has no influence on IO processing of an application sharing a network bandwidth in a product environment.

Specifically, in the product environment, a future input/output per second (IOPS) is predicted based on a past IOPS of the application sharing the network bandwidth, and a copy speed that does not exceed a maximum IOPS is presented when a specified (high speed, medium speed, and low speed) copy IOPS is superimposed.

A large amount of volumes are present in the storage device, and the I/O processing and the copy processing are executed by using a shared resource (a processor, a memory, and a physical drive group). Here, the copy speed varies depending on IO processing of a primary volume group, copy processing of a secondary volume group, a pair number, a resource usage rate, and a difference amount.

In the Patent Literature 1 described above, the copy speed is a fixed value, but in a situation where a large amount of volumes execute the IO processing and the copy processing at the same time, the copy speed changes. Therefore, there is a possibility that the copy speed is lower than a designated copy speed or the IO processing is delayed.

SUMMARY OF THE INVENTION

The invention has been made in view of the above circumstances, and an object thereof is to provide an operation management device and an operation management method capable of accurately predicting an inter-volume copy time.

In order to solve the technical problem, an operation management device according to one aspect of the invention performs operation management on a storage device including a plurality of resources and a plurality of volumes. In the storage device, IO processing and copy processing are performed between a plurality of volume groups in which the plurality of volumes are collected. The operation management system includes a processor, and the processor is configured to predict an inter-pool copy speed between the plurality of volume groups belonging to a same resource pool in the storage device, and predict an inter-volume copy time based on the predicted inter-pool copy speed.

According to the invention, it is possible to implement the operation management device and the operation management method capable of accurately predicting the inter-volume copy time.

One embodiment of the current invention comprises an operation management device configured to perform operation management on a storage device including a plurality of resources and a plurality of volumes, in the storage device, IO processing and copy processing being performed between a plurality of volume groups that store the plurality of volumes, the operation management device comprising: a processor, wherein the processor is configured to predict an inter-pool copy speed between the plurality of volume groups belonging to a same resource pool in the storage device, and predict an inter-volume copy time based on the predicted inter-pool copy speed.

In the operation management device, the processor is configured to predict the inter-pool copy speed based on an assumption that the inter-pool copy speed is equal in the plurality of volume groups in the same resource pool.

In the operation management device, the plurality of volume groups include a primary volume group and a secondary volume group that i) forms a copy pair with the primary volume group and ii) stores data of the primary volume group before the copy pair is formed.

In the operation management device, the processor is configured to calculate the inter-volume copy time between the plurality of volume groups belonging to the same resource pool in the storage device, by integrating, the predicted inter-pool copy speed, from i) a start time point of the copy processing between the plurality of volume groups to ii) an end time point at which a difference, amount between the plurality of volume groups, is reached.

In the operation management device, the processor is configured to predict the inter-pool copy speed by calculating a predicted value of measured data relating to past IO processing and the copy processing stored in the storage device, inputting the predicted value to a copy prediction model, and performing multiple regression analysis by the copy prediction model.

In the operation management device, the plurality of volume groups include a primary volume group and a secondary volume group that i) forms a copy pair with the primary volume group and ii) stores data of the primary volume before the copy pair is formed, and the processor is configured to use, as the measured data, an IOPS of the primary volume group, a usage rate of a resource, a pair number of the copy processing, a difference amount between the primary volume group and the secondary volume group, and a copy speed of the copy processing from the primary volume group to the secondary volume group, input, when the copy processing is added, a pair number of the added copy processing to the copy prediction model, and perform the multiple regression analysis by the copy prediction model by setting an objective variable as the copy speed and setting an explanatory variable as a value input to the copy prediction model wherein the explanatory variable is the IOPS of the primary volume group, the usage rate of the resource, the pair number of the copy processing, and the difference amount between the primary volume group and the secondary volume group.

In the operation management device, the processor is configured to predict the inter-pool copy speed by monitoring a difference amount between the plurality of volume groups, comparing a predicted different amount with the difference amount prior to the copy processing, and correcting the predicted difference amount when a deviation between the predicted difference amount and the different amount exceeds a threshold value.

In the operation management device, the processor is configured to predict, before the copy processing is performed, the inter-pool copy speed by reducing a usage rate of a resource or a pair number of the copy processing, which is the predicted value, when an end time point exceeds a predetermined time and the usage rate of the resource exceeds a threshold value.

The operation management device further comprises a display unit, wherein the processor is configured to cause the display unit to display a predicted value and a measured value of the inter-pool copy speed.

The operation management device further comprises a display unit, wherein the processor is configured to cause the display unit to display a predicted value of the inter-pool copy speed when the predicted difference amount is corrected and a predicted value of the inter-pool copy speed when the predicted difference amount is not corrected.

The operation management device further comprises: a display unit, wherein the processor is configured to cause the display unit to display a predicted value of the inter-pool copy speed when the usage rate of the resource or the pair number of the copy processing, which is the predicted value, is reduced, and a predicted value of the inter-pool copy speed when the usage rate of the resource or the pair number of the copy processing is not reduced.

An operation management method performed by an operation management device configured to perform operation management on a storage device including a plurality of resources and a plurality of volumes, wherein in the storage device, IO processing and copy processing are performed between a plurality of volume groups that store the plurality of volumes, the operation management device includes a processor, and the processor is configured to predict an inter-pool copy speed between the plurality of volume groups belonging to a same resource pool in the storage device, and predict an inter-volume copy time based on the predicted inter-pool copy speed.

BRIEF DESCRIPTION OF THE DRAWINGS

FIG. 7 is a diagram showing an example of the input hive tables of the operation management system according to the embodiment.

FIG. 8 is a diagram showing an example of work hive tables of the operation management system according to the embodiment.

FIG. 9 is a diagram showing an example of output hive tables of the operation management system according to the embodiment.

FIG. 10 is a diagram showing an example of the output hive tables of the operation management system according to the embodiment.

FIG. 11 is a flowchart showing data analysis processing of the operation management system according to the embodiment.

FIG. 19 is a diagram showing an example of output tables of the operation management system according to the embodiment.

DESCRIPTION OF THE PREFERRED EMBODIMENTS

Figure 1:
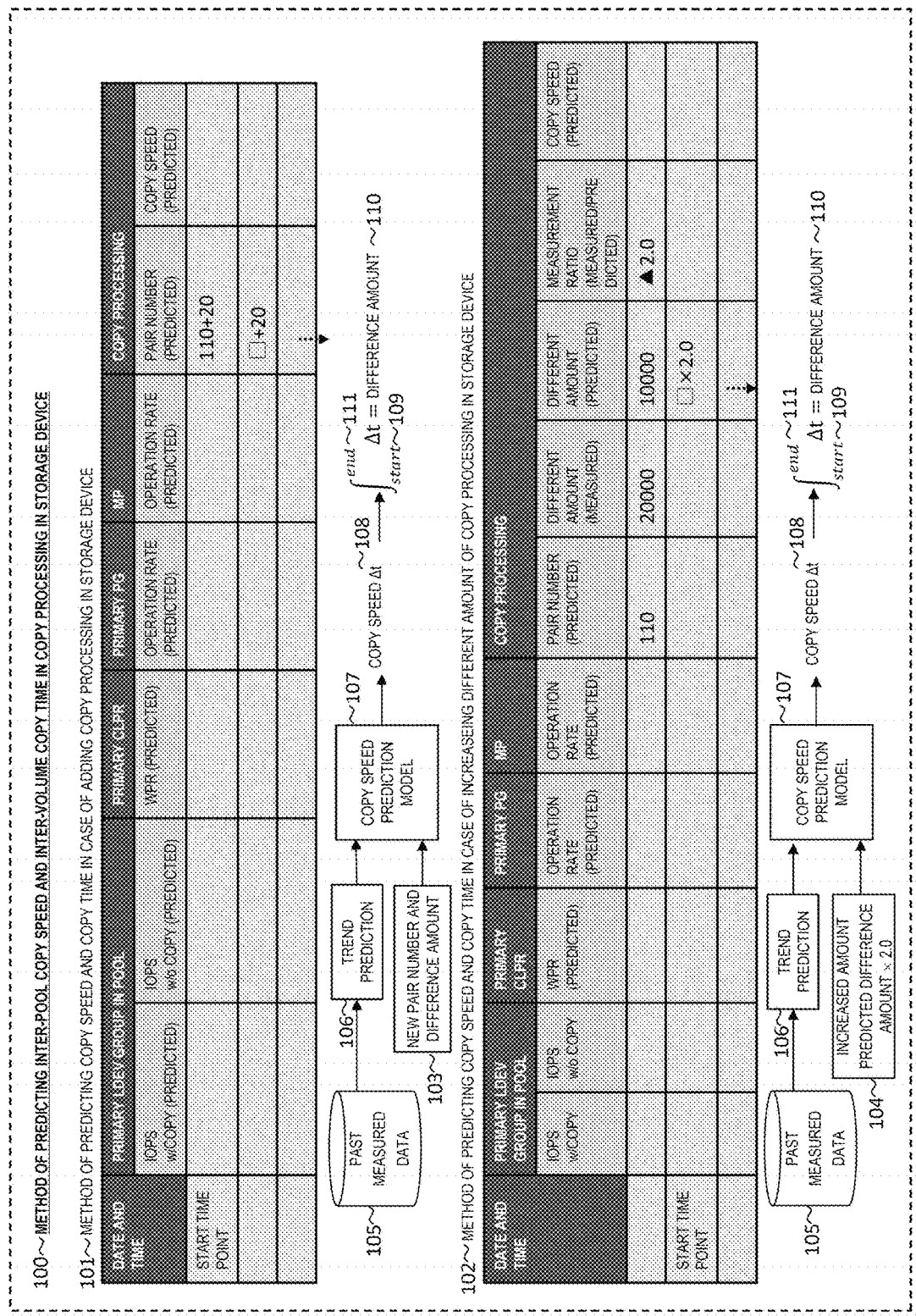
FIG. 1 is a diagram showing a concept of an operation of an operation management system according to an embodiment.

Hereinafter, an embodiment of the invention will be described with reference to the drawings. It should be noted that the embodiment to be described below does not limit the invention according to the claims, and all of the elements and combinations thereof described in the embodiment are not necessarily essential to the solution to the problem.

In an operation management device according to the present embodiment, an inter-pool copy speed is predicted by aggregating volume groups in the same resource pool instead of aggregating a volume unit. For a copy time of data between a primary volume group and a secondary volume group, the copy speed is integrated from a copy start using the copy speed between the resource pools to which each volume group belongs, and a time point at which a difference amount between the primary and secondary volumes is reached is set as an end time point.

The inter-pool copy speed is obtained by inputting operation prediction data to a copy speed prediction model. The operation prediction data includes a sum of IOPSs (classified by w/copy (IO processing performed at the same time with the copy processing) and w/o copy (IO processing not performed at the same time with the copy processing)) of all primary volumes in a pool, an operation rate of a physical drive group constituting the pool, a ratio (WPR: write pending rate) of waiting for write in a cache used by the volume group in the resource pool, a processor operation rate, a copy pair number, and a difference amount between pairs.

The copy speed prediction model is obtained by multiple regression analysis. An explanatory variable includes the sum of IOPSs (classified by w/copy and w/o copy) of all the primary volume groups in the pool, a resource usage rate, the pair number, and an inter-pair difference data amount. An objective variable includes a sum of copy IOPSs of all secondary volume groups in the resource pool, which is the copy speed. The copy IOPS is obtained by multiplying the number of times of data write from a cache used by the secondary volume group to a disk (physical drive) for one second by a copy data size per copy.

When a new volume is created to create a pair, a new pair number and a new difference amount are added to the input of the copy speed prediction model. Further, when the difference amount is larger than a predicted difference amount in a periodic copy, the predicted difference amount is corrected to predict the copy speed. The correction is performed by multiplying the predicted difference amount by a measured ratio with respect to the prediction at the start of copy.

Further, when the copy time is expected to be prolonged by the copy time prediction, a resource usage rate and a pair number after a countermeasure are input to the copy speed prediction model to grasp in advance an effect and an influence of the countermeasure.

In the following description, a "memory" is one or more memories, and may typically be a main storage device. At least one memory in a memory unit may be a volatile memory or a nonvolatile memory.

Further, in the following description, a "processor" is one or more processors. At least one processor is typically a microprocessor such as a central processing unit (CPU), and may be another type of processor such as a graphics processing unit (GPU). At least one processor may be a single-core processor or may be a multi-core processor.

Further, at least one processor may be a processor in a broad sense such as a hardware circuit (for example, a field-programmable gate array (FPGA) or an application specific integrated circuit (ASIC)) which performs a part or all of processing.

Further, in the following description, an expression such as "xxx table" may be used to describe information in which an output is obtained in response to an input, and the information may be data having any structure, or may be a learning model such as a neural network which generates the output for the input. Therefore, the "xxx table" can be referred to as "xxx information".

In the following description, a configuration of each table is an example, one table may be divided into two or more tables, and all or a part of the two or more tables may be one table.

Further, in the following description, there is a case in which processing is described using a "program" as a subject. Since the program is executed by a processor to perform determined processing appropriately using a memory resource (for example, a memory) and/or a communication interface device (for example, a port), the subject of the processing may be the program. The processing described using the program as the subject may be processing performed by the processor or a computer including the processor.

The program may be installed in a device such as a computer, for example, in a program distribution server or a computer readable (for example, non-transitory) recording medium. Further, in the following description, two or more programs may be implemented as one program, or one program may be implemented as two or more programs.

Further, in the following description, in a case of describing the same kind of elements without being distinguished from each other, reference symbols (or common symbols among the reference symbols) are used, and in a case of describing the same kind of elements distinguished from each other, an identification number (or the reference symbol) of the element may be used.

First, an overview of a storage device for which an operation management system (operation management device) according to the present embodiment performs operation management will be described.

Figure 5:
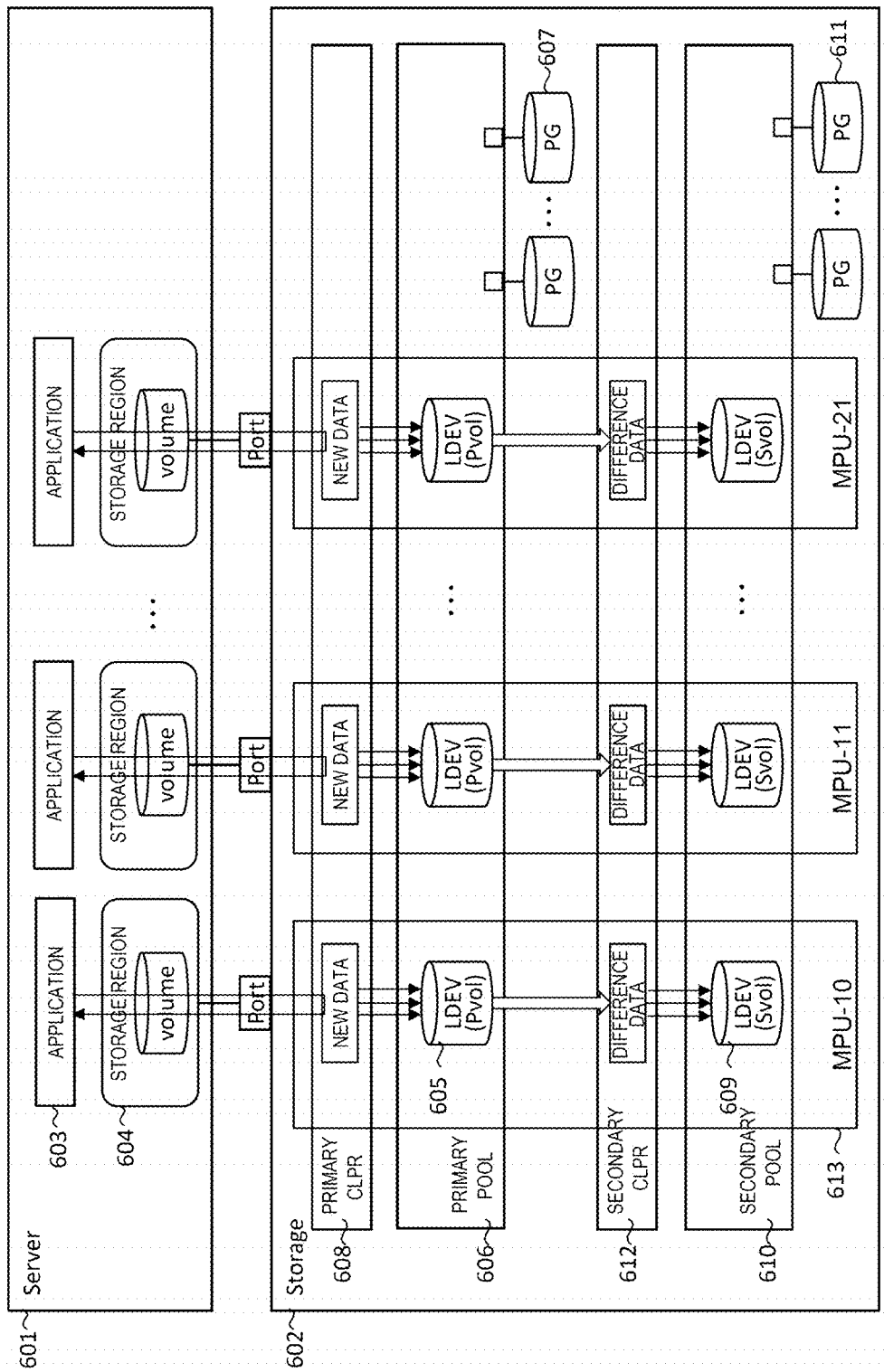
FIG. 5 is a diagram showing a schematic configuration of a server and a storage device for which the operation management system according to the embodiment performs operation management.

FIG. 5 is a diagram showing a schematic configuration of a server and the storage device for which the operation management system according to the embodiment performs the operation management.

In a server 601 and a storage 602, applications 603 store various pieces of data in each volume 604 in a storage region. The data stored in the volumes 604 in the storage region is a transaction log (TRX), user data (Table), system management information (System), and the like.

Each volume 604 in the storage region is stored in a logic device (LDEV) 605 in the storage 602. The LDEV 605 is called a primary volume (Pvol), and a pool including LDEVs 605 is a primary Pool 606. The primary Pool 606 includes physical drive group parity groups (PGs) 607, and uses a primary cache logic partition (CLPR) 608. New data is stored in the primary CLPR.

The LDEV 605 generates an LDEV 609 and a copy pair. The LDEV 609 is called a secondary volume (Svol), and a pool including LDEVs 609 is a secondary pool 610. The secondary pool 610 includes PGs 611, and uses a secondary CLPR 612. Difference data is stored in the secondary CLPR 612.

The primary LDEV 605 and the secondary LDEV 609, which is a copy pair, use a same micro processing unit (MPU) 613.

FIG. 1 is a schematic diagram of the present embodiment, and shows a method 100 of predicting the inter-pool copy speed and an inter-volume copy time of the primary volume and the secondary volume in the copy processing in the storage device.

Representative use case includes a case 101 in which the copy processing is added in the storage device, and a case 102 in which a difference amount in the storage device is larger than usual in periodic copy processing.

In the case 101 in which the copy processing is added in the storage device, a resource usage rate and an IO amount consumed in the newly added copy processing are represented by a pair number 103. By setting the pair number, when copy is started at any timing in the future, a future copy speed can be predicted by adding the pair number.

In the case 102 in which the copy difference amount in the storage device is larger, a ratio of the predicted difference amount with respect to the measurement is monitored, and when the ratio exceeds a threshold value (for example, 2 times), the predicted difference amount is corrected (predicted difference amount×2), and the future copy speed is predicted by a corrected difference amount 104.

A method of predicting the copy speed is shown in a situation where a large amount of primary volume groups and secondary volume groups execute the IO processing and the copy processing at the same time.

First, trends of the IOPS of the primary volume group, the resource usage rate, the pair number, and the difference amount of the primary volume group are predicted 106 based on past measured data 105.

Next, a trend prediction result 106 is input to a copy speed prediction model 107, and a copy speed 108 is output. Here, the copy speed prediction model 107 is a multiple regression analysis model using an IOPS of a past primary volume group, a resource usage rate, a pair number, and a difference amount as the explanatory variables and a copy speed (copy IOPS of a past secondary volume group) as the objective variable.

In the case 101 in which the copy processing is added in the storage device, the pair number and the difference amount 103 are also input. In contrast, in the case 102 in which the difference amount in the storage device in the periodic copy is larger than usual, the corrected predicted difference amount 104 is input.

Finally, the copy speed 108 is integrated from a start time point 109 to obtain an end time point 111 at which a difference amount 110 is reached. A time from a start to an end is referred to as the copy time.

Figure 2:
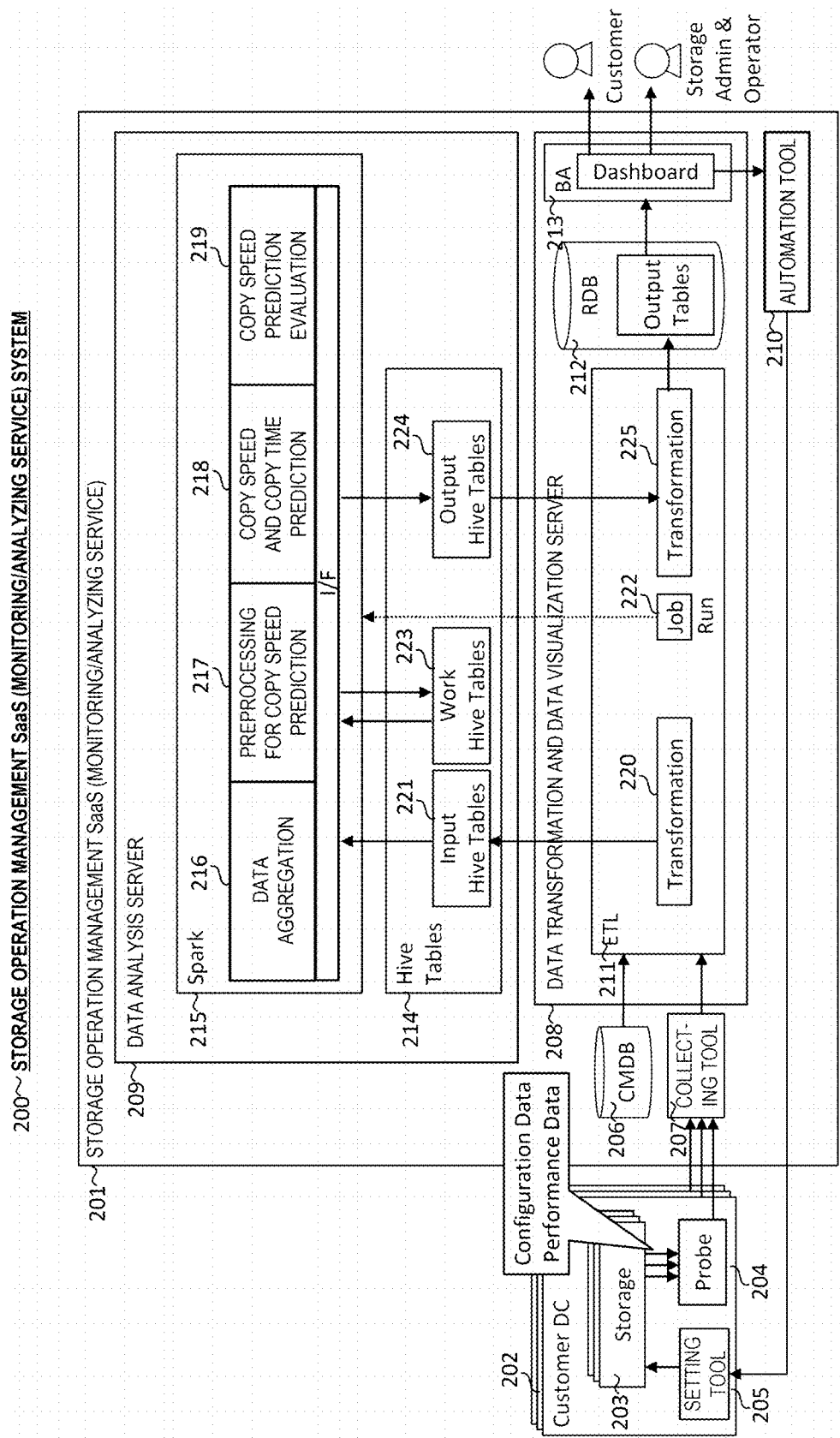
FIG. 2 is a diagram showing a schematic configuration of the operation management system according to the embodiment.

FIG. 2 is a configuration diagram of a storage operation management SaaS (monitoring/analyzing service) system 200 according to the present embodiment, including a storage operation management SaaS (monitoring/analyzing service) 201, a customer data center (DC) 202, and a remote site to be used.

The customer DC 202 includes a storage device 203, a probe 204 which collects configuration data and performance data, and a setting tool 205 which allocates a resource to an internal component of the storage device 203.

The storage operation management SaaS (monitoring/analyzing service) 201 includes a configuration management database (DB) 206, a collecting tool 207, a data transformation and data visualization server 208, a data analysis server 209, and an automation tool 210.

The CMDB 206 stores service level management information (IOPS, a recovery point objective (RPO), a recovery time objective (RTO), and the like) for a resource pool of the storage device 203.

The collecting tool 207 collects the configuration data and the performance data from the probe 204 in one or more customer DCs 202.

The data transformation and data visualization server 208 includes an extract, transform, load (ETL) 211, a relational database (RDB) 212, and a business application (BA) 213.

The data analysis server 209 includes hive tables 214 in which data is stored and a spark 215 which executes processing.

The spark 215 includes a data aggregation program 216, a preprocessing program 217 for copy speed prediction, a copy speed and copy time prediction program 218, and a copy speed prediction evaluation program 219.

A transformation 220 of the ETL 211 transforms data from the CMDB 206 and the collecting tool 207, and stores the transformed data in input hive tables 221 included in the hive tables 214. When a job 222 of the ETL 211 is executed, the various programs 216 to 219 in the spark 215 are executed in order.

The program inputs the input hive tables 221, stores and uses temporary data in work hive tables 223, and stores a result in output hive tables 224.

A transformation 225 of the ETL 211 transforms data from the output hive tables 224 and stores the transformed data in output tables of the RDB 212.

The BA 213 acquires the data from the output tables of the RDB 212 and displays the data on a dashboard. The automation tool 210 is called from the BA 213, and executes a countermeasure (resource reallocation, change of the pair number, change of the start time point, and the like).

Figure 3:
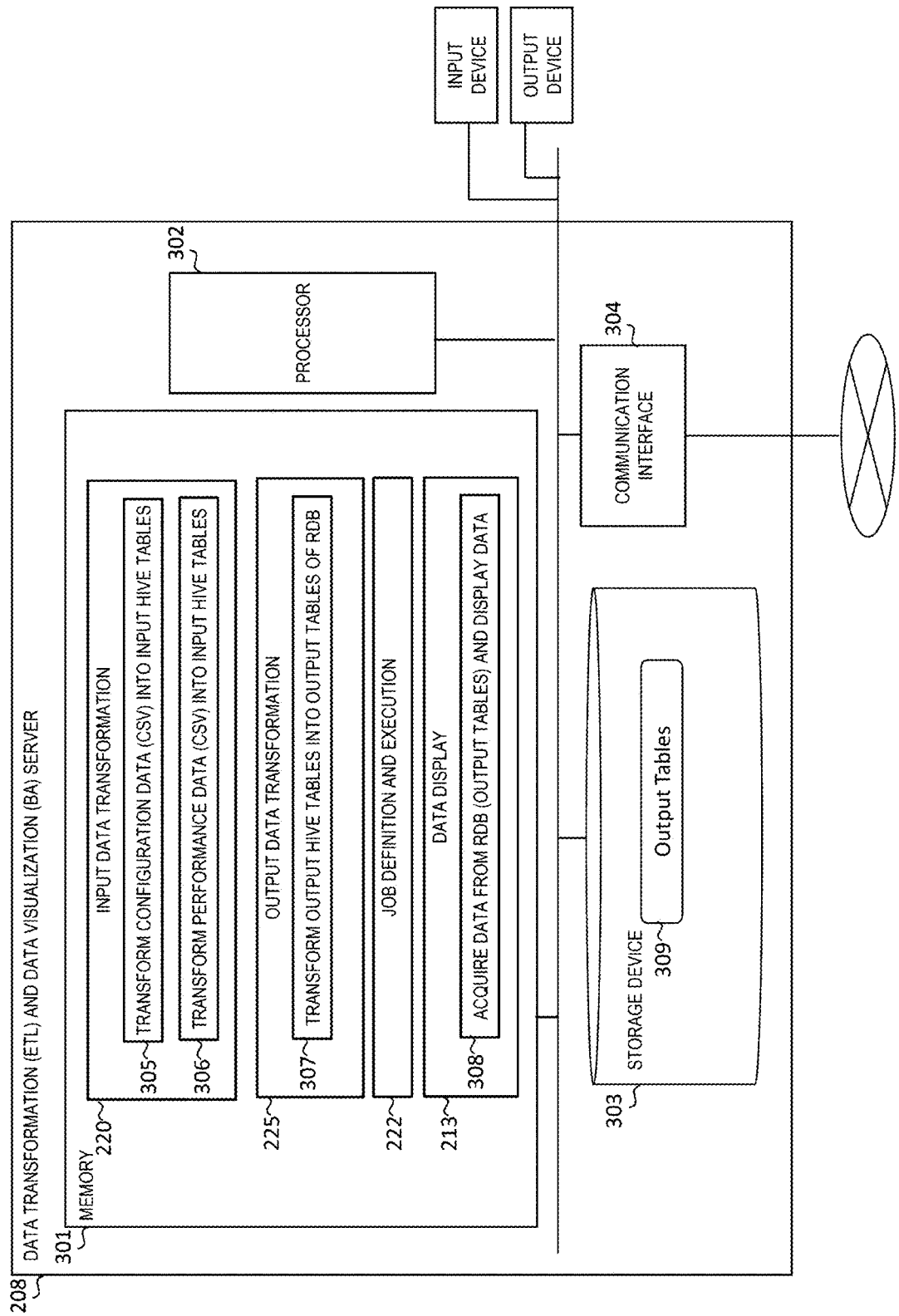
FIG. 3 is a diagram showing a configuration of a data transformation (ETL) and data visualization (BA) server of the operation management system according to the embodiment.

FIG. 3 is a configuration diagram of the data transformation and data visualization server 208.

Processing of input data transformation 220, output data transformation 225, job definition and execution 222, and data display 213 of the data transformation and data visualization server 208 in FIG. 3 can be specifically implemented by hardware including a memory 301, a processor 302, a storage device 303, and a communication interface 304.

Further, output tables 309 are stored in the storage device 303.

Input information from the CMDB 206 and the collecting tool 207, input/output information exchanged with the data analysis server 209, and input/output information exchanged from a remote terminal via a web browser are input/output via the communication interface 304.

The input data transformation 220 includes processing 305 of transforming the configuration data (CSV) into input hive tables 221, and processing 306 of transforming the performance data (CSV) into the input hive tables 221.

The input data transformation 225 includes processing 307 of transforming the output hive tables 224 into the output tables 309 of the RDB 212.

The data display 213 includes processing 308 of acquiring data from the output tables 309 of the RDB 212 and displaying the data.

Figure 4:
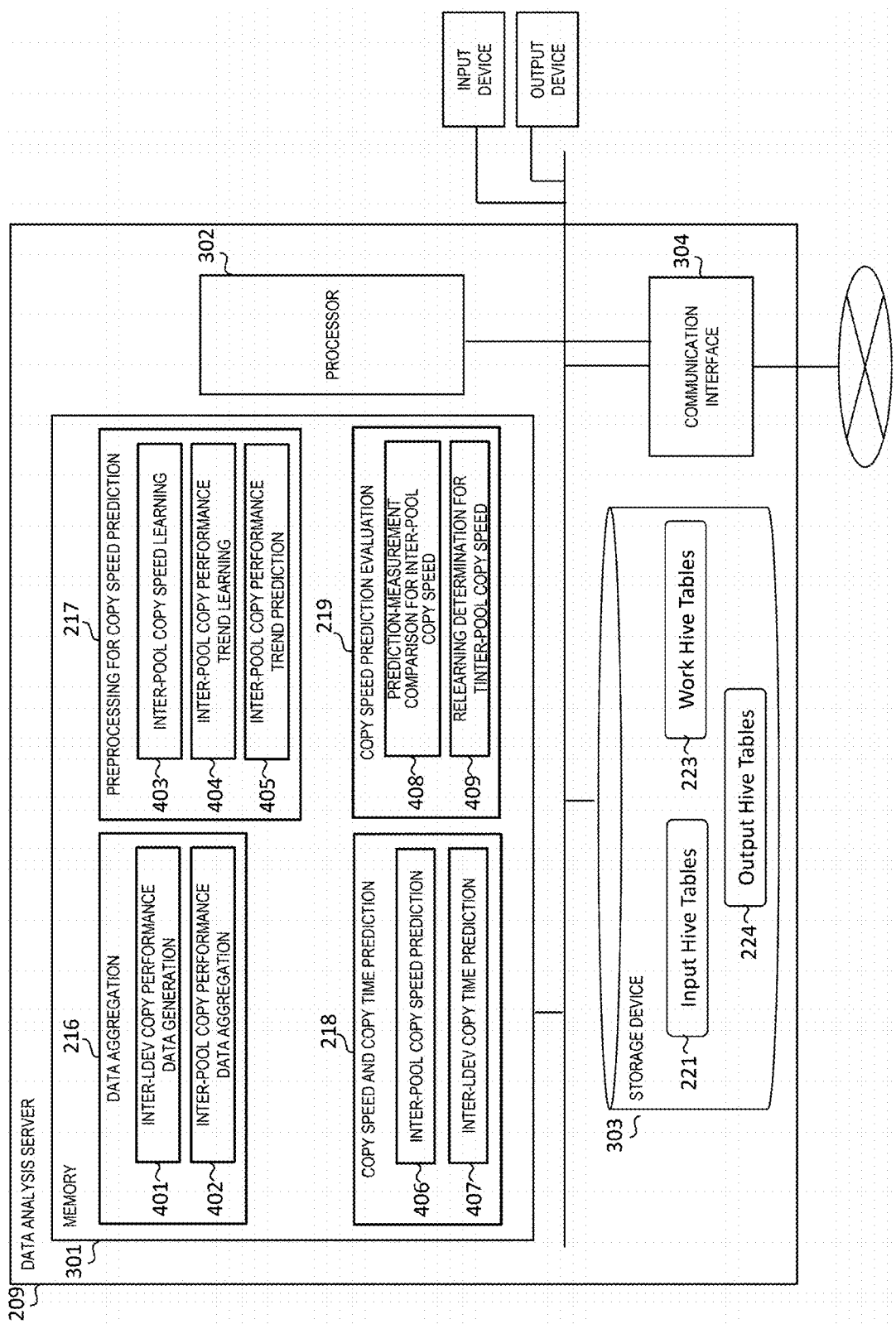
FIG. 4 is a diagram showing a configuration of a data analysis server of the operation management system according to the embodiment.

FIG. 4 is a configuration diagram of the data analysis server 209.

The processing of the data aggregation program 216, the preprocessing program 217 for copy speed prediction, the copy speed and copy time prediction program 218, and the copy speed prediction evaluation program 219 of the data analysis server 209 in FIG. 4 can be specifically implemented by the hardware including the memory 301, the processor 302, the storage device 303, and the communication interface 304.

Further, the input hive tables 221, the work hive tables 223, and the output hive tables 224 are stored in the storage device 303.

The input/output information exchanged with the data transformation and data visualization server 208 is input/output via the communication interface 304.

The data aggregation program 216 includes inter-LDEV copy performance data generation 401 and inter-pool copy performance data aggregation 402.

The preprocessing program 217 for copy speed prediction includes inter-pool copy speed learning 403, inter-pool copy performance trend learning 404, and inter-pool copy performance trend prediction 405.

The copy speed and copy time prediction program 218 includes inter-pool copy speed prediction 406 and inter-LDEV copy time prediction 407.

The copy speed prediction evaluation program 219 includes prediction-measurement comparison 408 for the inter-pool copy speed and relearning determination 409 for the inter-pool copy speed.

Figure 6:
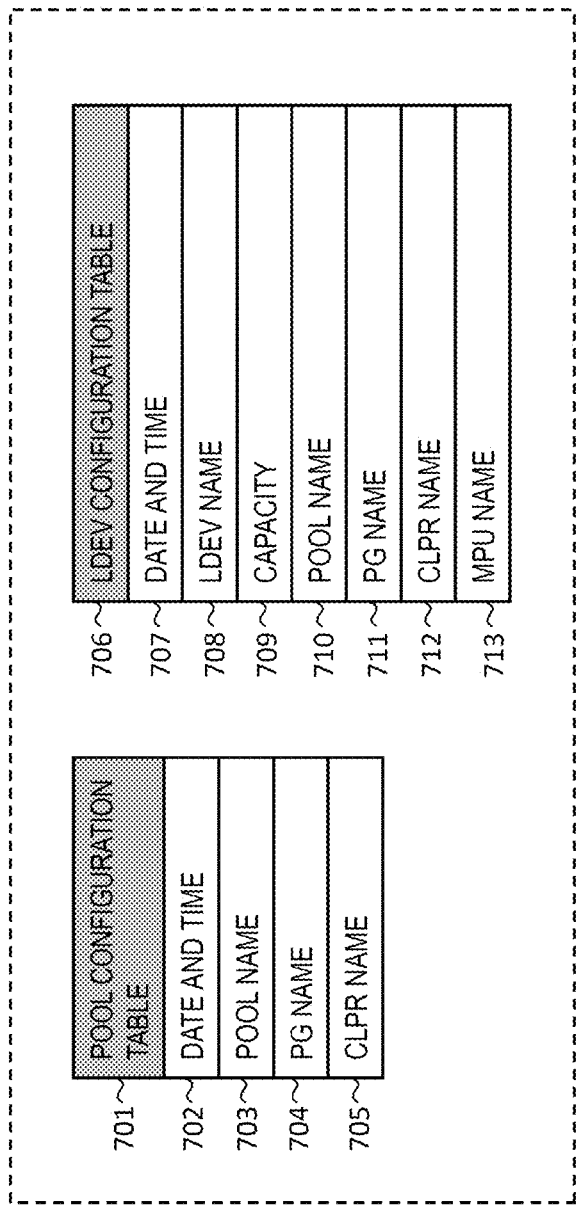
FIG. 6 is a diagram showing an example of input hive tables of the operation management system according to the embodiment.

FIGS. 6 and 7 show the input hive tables 221 in the hive tables 214.

The input hive tables 221 includes a pool configuration table 701, an LDEV configuration table 706, an inter-LDEV copy operation table 714, an inter-LDEV copy state table 719, an LDEV_IOPS table 725, an LDEV_C2D number of times table 729, a PG resource table 733, a CLPR resource table 737, and an MPU resource table 741.

The pool configuration table 701 includes a date and time 702, a pool name 703, a PG name 704, and a CLPR name 705. The LDEV configuration table 706 includes a date and time 707, an LDEV name 708, a capacity 709, a pool name 710, a PG name 711, a CLPR name 712, and an MPU name 713.

The inter-LDEV copy operation table 714 includes a date and time 715, a primary LDEV name 716, a secondary LDEV name 717, and an operation (copy start and copy end) 718. The inter-LDEV copy state table 719 includes a date and time 720, a primary LDEV name 721, a secondary LDEV name 722, a state (copy on and copy off) 723, and an inter-LDEV difference amount 724. The LDEV_IOPS table 725 includes a date and time 726, an LDEV name 727, and an IOPS 728. The LDEV_C2D number of times table 729 includes a date and time 730, an LDEV name 731, and a cache to drive number of times 732. The PG resource table 733 includes a date and time 734, a PG name 735, and a PG operation rate 736. The CL PR resource table 737 includes a date and time 738, a CLPR name_allocated MPU name 739, and a write pending rate 740. The MPU resource table 741 includes a date and time 742, an MPU name 743, and an MPU operation rate 744.

FIG. 8 shows the work hive tables 223 in the hive tables 214.

The work hive tables 223 includes an IOPS w/o copy prediction model table 801, an IOPS w/copy prediction model table 806, a PG prediction model table 811, a CLPR prediction model table 816, an MPU prediction model table 821, an in-pool pair number prediction model table 826, an inter-pool difference amount prediction model table 831, and an inter-pool copy speed prediction model table 837.

The IOPS w/o copy prediction model table 801 includes a start date and time 802, an end date and time 803, an LDEV name 804, and an IOPS w/o copy prediction function 805. The IOPS w/copy prediction model table 806 includes a start date and time 807, an end date and time 808, an LDEV name 809, and an IOPS w/copy prediction function 810. The PG prediction model table 811 includes a start date and time 812, an end date and time 813, a PG name 814, and a PG operation rate prediction function 815. The CLPR prediction model 816 includes a start date and time 817, an end date and time 818, a CLPR name_allocated MPU name 819, and a write pending rate prediction function 820. The MPU prediction model table 821 includes a start date and time 822, an end date and time 823, an MPU name 824, and an MPU operation rate prediction function 825. The in-pool pair number prediction model table 826 includes a start date and time 827, an end date and time 828, a pool name 829, and a pair number prediction function 830. The inter-pool difference amount prediction model table 831 includes a start date and time 832, an end date and time 833, a primary pool name 834, a secondary pool name 835, and a difference amount prediction function 836. The inter-pool copy speed prediction model table 837 includes a primary pool name 838, a secondary pool name 839, and an inter-pool copy speed prediction function 840.

FIGS. 9 and 10 show the output hive tables 224 in the hive tables 214.

The output hive tables 224 includes an inter-LDEV copy performance table 901, an inter-pool copy performance table 912, an inter-pool copy speed learning table 918, an inter-pool copy speed prediction table 931, an IOPS prediction table 942, a PG prediction table 946, a CLPR prediction table 950, an MPU prediction table 954, an in-pool pair number prediction table 958, an inter-pool difference amount prediction table 963, a predicted inter-pool copy speed table 968, and an inter-LDEV copy time table 977.

The inter-LDEV copy performance table 901 includes a date and time 902, a primary LDEV name 903, a primary pool name 904, a secondary LDEV name 905, a secondary pool name 906, an IOPS w/o copy 907 of the primary LDEV, an IOPS w/copy 908 of the primary LDEV, the number of times of C2D 909 of the secondary LDEV, a copy IOPS 910 of the secondary LDEV, and an inter-LDEV difference amount 911. The inter-pool copy performance table 912 includes a date and time 913, a primary pool name 914, a secondary pool name 915, an inter-pool pair number 916, and an inter-pool difference amount 917. The inter-pool copy speed learning table 918 includes a date and time 919, a primary pool name 920, a secondary pool name 921, an IOPS w/o copy 922 of an LDEV group in the primary pool, an IOPS w/copy 923 of the LDEV group in the primary pool, an inter-pool pair number 924, an inter-pool difference amount 925, the number of times of C2D 926 of the LDEV group in the secondary pool, a copy IOPS 927 of the LDEV group in the secondary pool, a WPR 928 of an MPU 10 of the primary CLPR, an operation rate 929 of the MPU 10, and an operation rate 930 of a primary PG. The inter-pool copy speed prediction table 931 includes a date and time 932, a primary pool name 933, a secondary pool name 934, an IOPS w/o copy (predicted) 935 of the LDEV group in the primary pool, an IOPS w/copy (predicted) 936 of the LDEV group in the primary pool, an inter-pool pair number (predicted) 937, an inter-pool difference amount (predicted) 938, a WPR (predicted) 939 of the MPU 10 of the primary CLPR, an operation rate (predicted) 940 of the MPU 10, and an operation rate (predicted) 941 of the primary PG.

The IOPS prediction table 942 includes a date and time 943, an LDEV name 944, and an IOPS 945. The PG prediction table 946 includes a date and time 947, a PG name 948, and a PG operation rate 949. The CLPR prediction table 950 includes a date and time 951, a CLPR name_allocated MPU name 952, and a WPR 953. The MPU prediction table 954 includes a date and time 955, an MPU name 956, and an MPU operation rate 957. The in-pool pair number prediction table 958 includes a date and time 959, a primary pool name 960, a secondary pool name 961, and an inter-pool pair number 962. The inter-pool difference amount prediction table 963 includes a date and time 964, a primary pool name 965, a secondary pool name 966, and an inter-pool difference amount 967. The predicted inter-pool copy speed table 968 includes a date and time 969, a primary pool name 970, a secondary pool name 971, a predicted inter-pool copy speed 972, a predicted inter-pool copy speed (upper limit) 973, a predicted inter-pool copy speed (lower limit) 974, a measured inter-pool copy speed (copy IOPS of the LDEV group in the secondary pool) 975, and an in/out of prediction range 976. The inter-LDEV copy time table 977 includes a copy start time point 978, a copy end time point 979, an inter-LDEV copy time 980, a primary LDEV name 981, and a secondary LDEV name 982.

FIG. 11 is a data analysis processing flow executed in the data analysis server 209.

The data analysis processing shown in the flowchart of FIG. 11 is executed by the data aggregation program 216, the preprocessing program 217 for copy speed prediction, and the copy speed and copy time prediction program 218. Further, a measurement result is input to the data aggregation program 216 and evaluation is made by the copy speed prediction evaluation program 219. When relearning is necessary, the program is shifted to the preprocessing program 217 for copy speed prediction, and when the relearning is unnecessary, the program is shifted to the copy speed and copy time prediction program.

Figure 12:
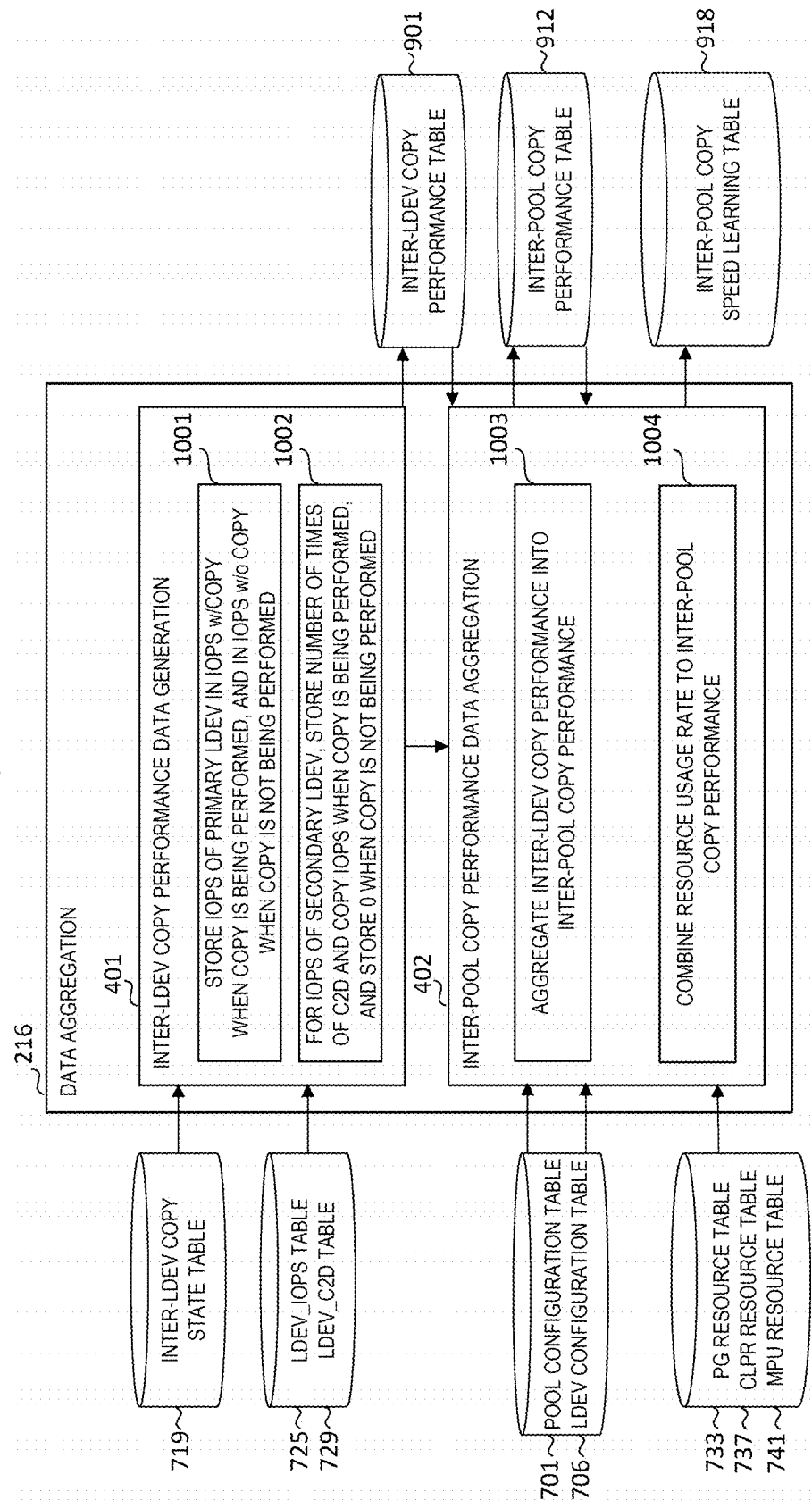
FIG. 12 is a flowchart showing data aggregation processing of the operation management system according to the embodiment.

FIG. 12 is a processing flow of the data aggregation 216.

In the inter-LDEV copy performance data generation 401, the inter-LDEV copy state table 719, the LDEV_IOPS table 725, and the LDEV_C2D table 729 are column-combined using the same date and time as a key, and a result is stored in the inter-LDEV copy performance table 901.

In processing 1001, an IOPS of the primary LDEV is stored in the IOPS w/copy when the copy is being performed, and is stored in the IOPS w/o copy when the copy is not being performed.

In processing 1002, for an IOPS of the secondary LDEV, the number of times of C2D and the copy IOPS (C2D×copy data size/times) are stored when the copy is being performed, and 0 is stored when the copy is not being performed.

The inter-pool copy performance data aggregation 402 includes processing 1003 of aggregating an inter-LDEV copy performance into an inter-pool copy performance and processing 1004 of combining the resource usage rate to the inter-pool copy performance.

In the processing 1003 of aggregating the inter-LDEV copy performance into the inter-pool copy performance, the inter-LDEV copy performance (IOPS w/copy, IOPS w/o copy, C2D, and copy IOPS) is added to a pair of a pool of the primary LDEV and a pool of the secondary LDEV.

In the processing 1004 of combining the resource usage rate to the inter-pool copy performance, the resource usage rate (PG, CLPR, and MPU) used by the inter-pool copy pair is added.

Figure 13:
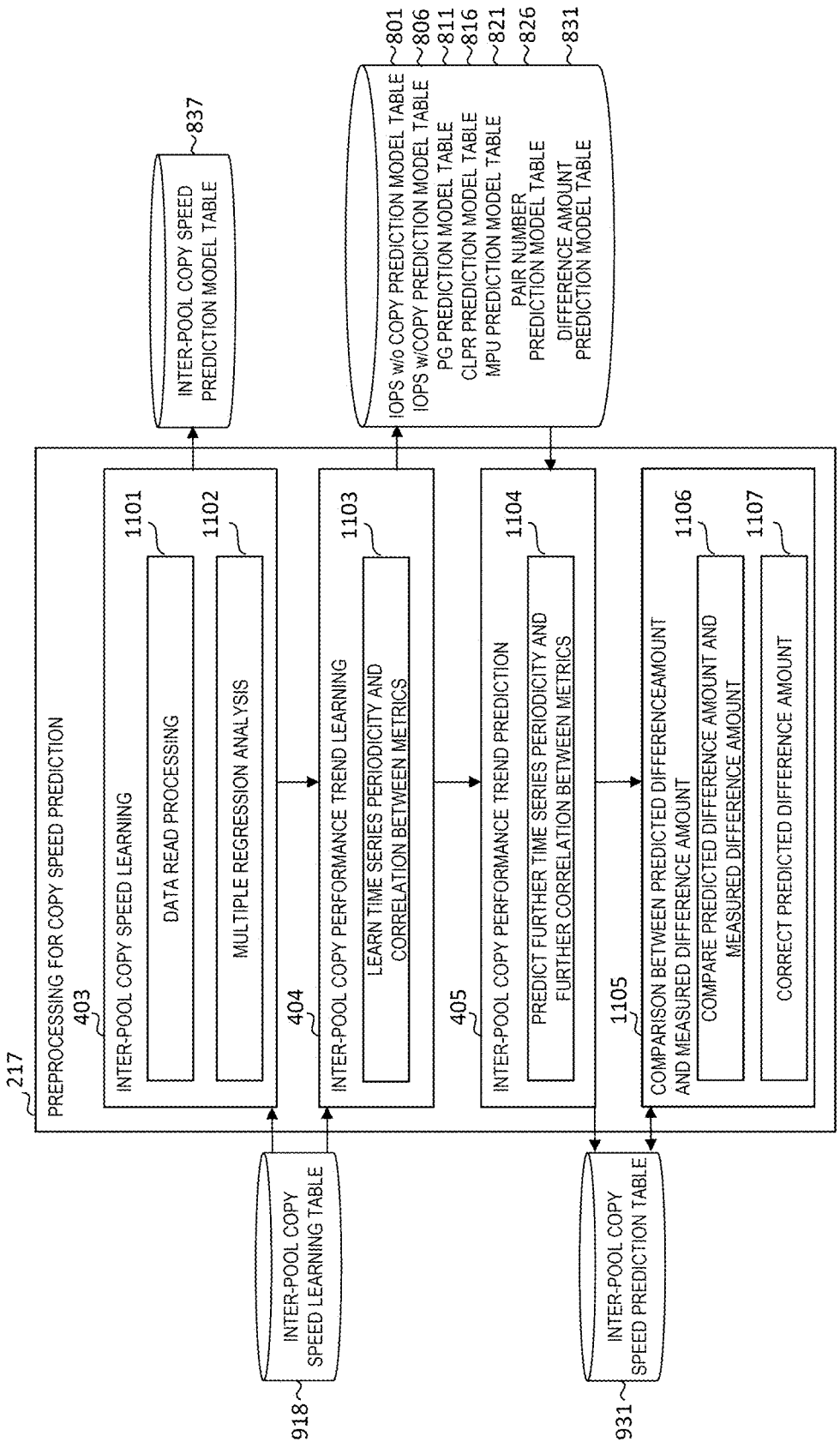
FIG. 13 is a flowchart showing preprocessing for copy speed prediction in the operation management system according to the embodiment.

FIG. 13 is a processing flow of the preprocessing 217 for copy speed prediction.

In the inter-pool copy speed learning 403, the inter-pool copy speed learning table 918 is input in data read processing 1101, the explanatory variable and the objective variable are defined, multiple regression analysis 1102 is executed, and a result is stored in the inter-pool copy speed prediction model table 837.

In the inter-pool copy performance trend learning 404, the inter-pool copy speed learning table 918 is input, a time series periodicity and a correlation between metrics are learned in processing 1103, and a result is stored in the IOPS w/o copy prediction model table 801, the IOPS w/copy prediction model table 806, the PG prediction model table 811, the CLPR prediction model table 816, the MPU prediction model table 821, the in-pool pair number prediction model table 826, and the inter-pool difference amount prediction model table 831.

In the inter-pool copy performance trend prediction 405, the trend prediction models 801, 806, 811, 816, 821, 826, and 831 are input, a future time series periodicity and a further correlation between metrics are predicted in processing 1104, and a result is stored in the inter-pool copy speed prediction table 931.

In comparison 1105 between a predicted difference amount and a measured difference amount, the inter-pool copy speed prediction table 931 is input, a predicted difference amount and a measured difference amount are compared in processing 1106, the predicted difference amount is corrected in processing 1107, and a result is stored in the inter-pool copy speed prediction table.

Figure 14:
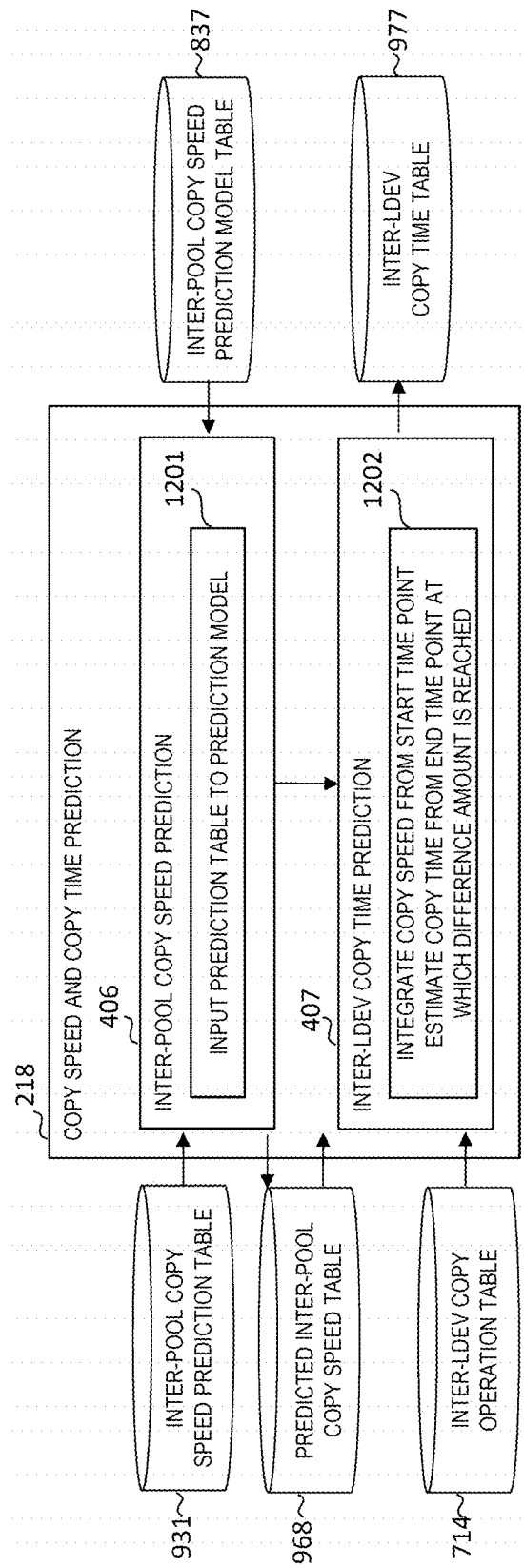
FIG. 14 is a flowchart showing processing of predicting a copy speed and a copy time in the operation management system according to the embodiment.

FIG. 14 is a processing flow of the copy speed and copy time prediction 218.

In the inter-pool copy speed prediction 406, the inter-pool copy speed prediction table 931 is input to the inter-pool copy speed prediction model table 837, and a result is stored in the predicted inter-pool copy speed table 968.

In the inter-LDEV copy time prediction 407, the predicted inter-pool copy speed table 968 and the inter-LDEV copy operation table 714 are input, and in processing 1202, the copy speed is integrated from the start time point, the copy time is estimated from the end time point at which a difference amount is reached, and a result is stored in the inter-LDEV copy time table 977.

Figure 15:
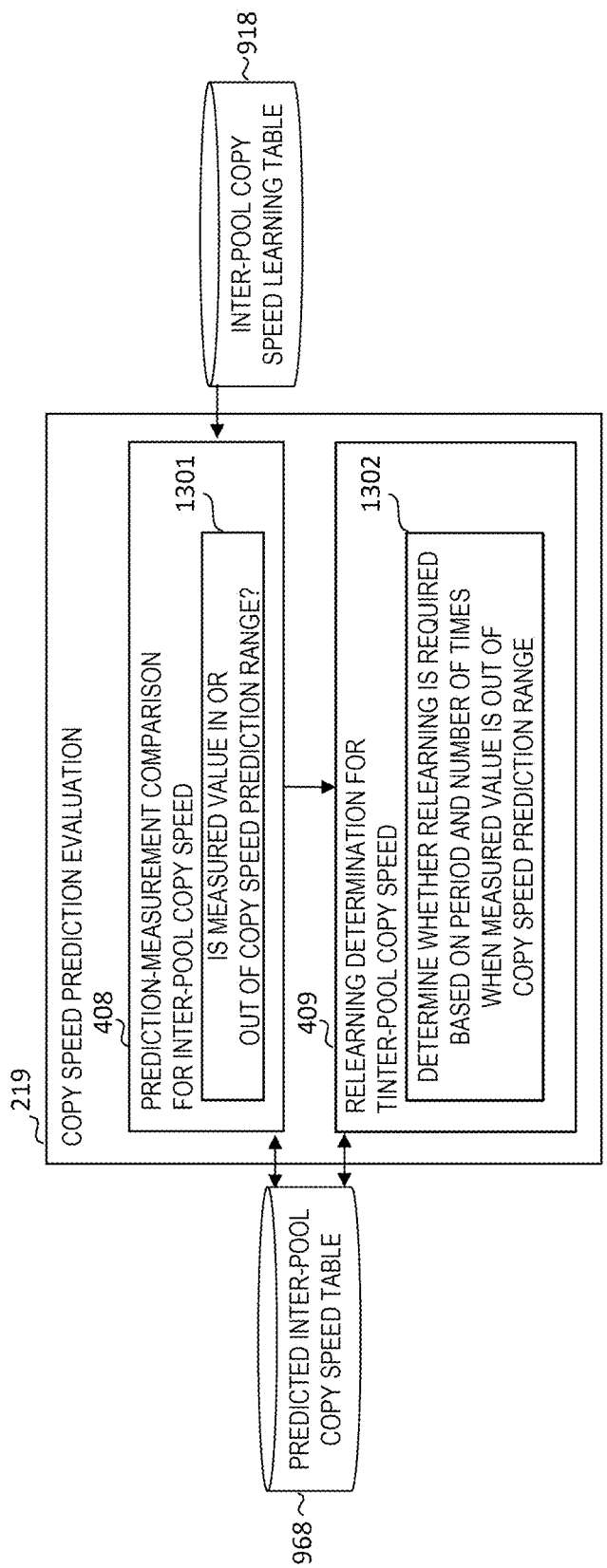
FIG. 15 is a flowchart showing processing of evaluating the copy speed prediction in the operation management system according to the embodiment.

FIG. 15 is a processing flow of the copy speed prediction evaluation 219.

In the prediction-measurement comparison 408 for the inter-pool copy speed, the predicted inter-pool copy speed table 968 and the inter-pool copy speed learning table 918 are input, it is determined in processing 1301 whether the measured value is in or out of a copy speed prediction range, and a result is stored in the predicted inter-pool copy speed table.

In the relearning determination 409 for the inter-pool copy speed, the predicted inter-pool copy speed table 968 is input, and it is determined in processing 1302 whether the relearning is required based on a period and the number of times when the measured value is out of the copy speed prediction range.

Figure 16:
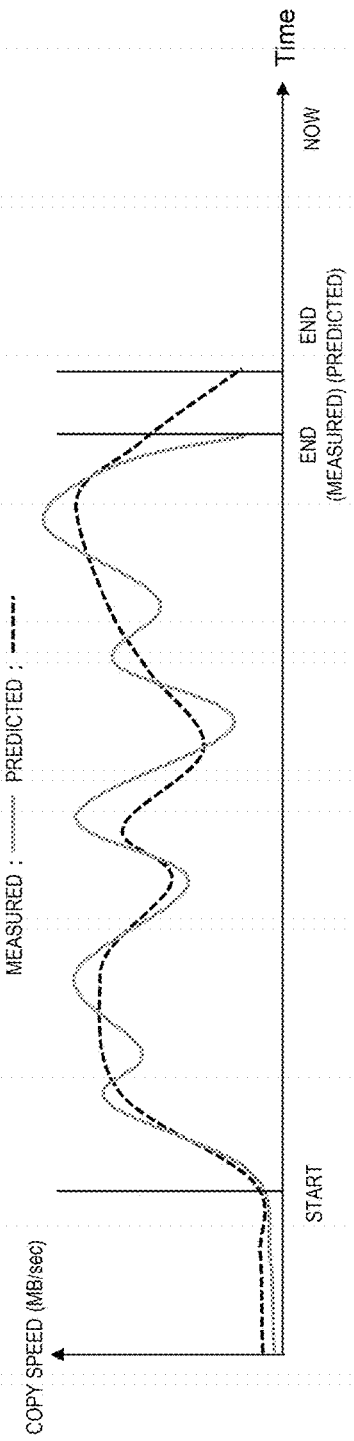
FIG. 16 is a diagram showing an example of a display screen of the operation management system according to the embodiment.
Figure 17:
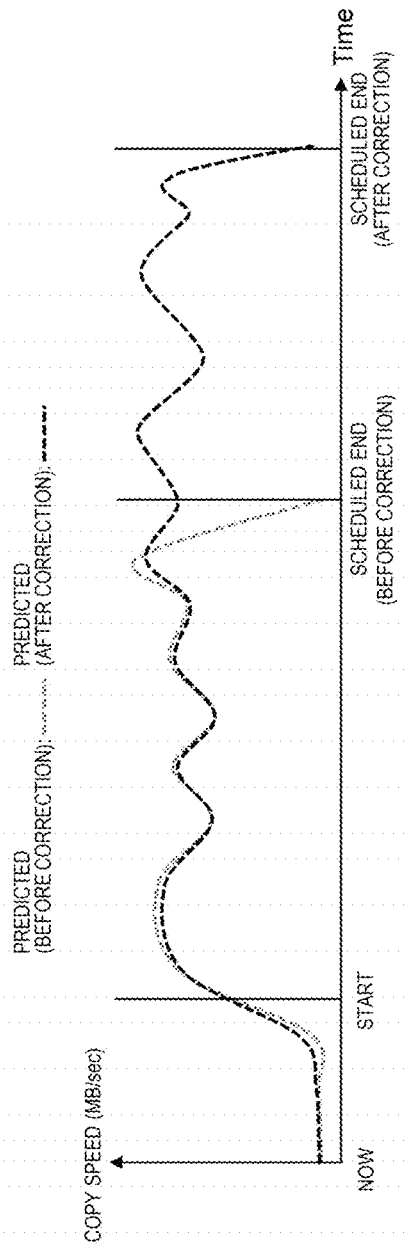
FIG. 17 is a diagram showing another example of the display screen of the operation management system according to the embodiment.
Figure 18:
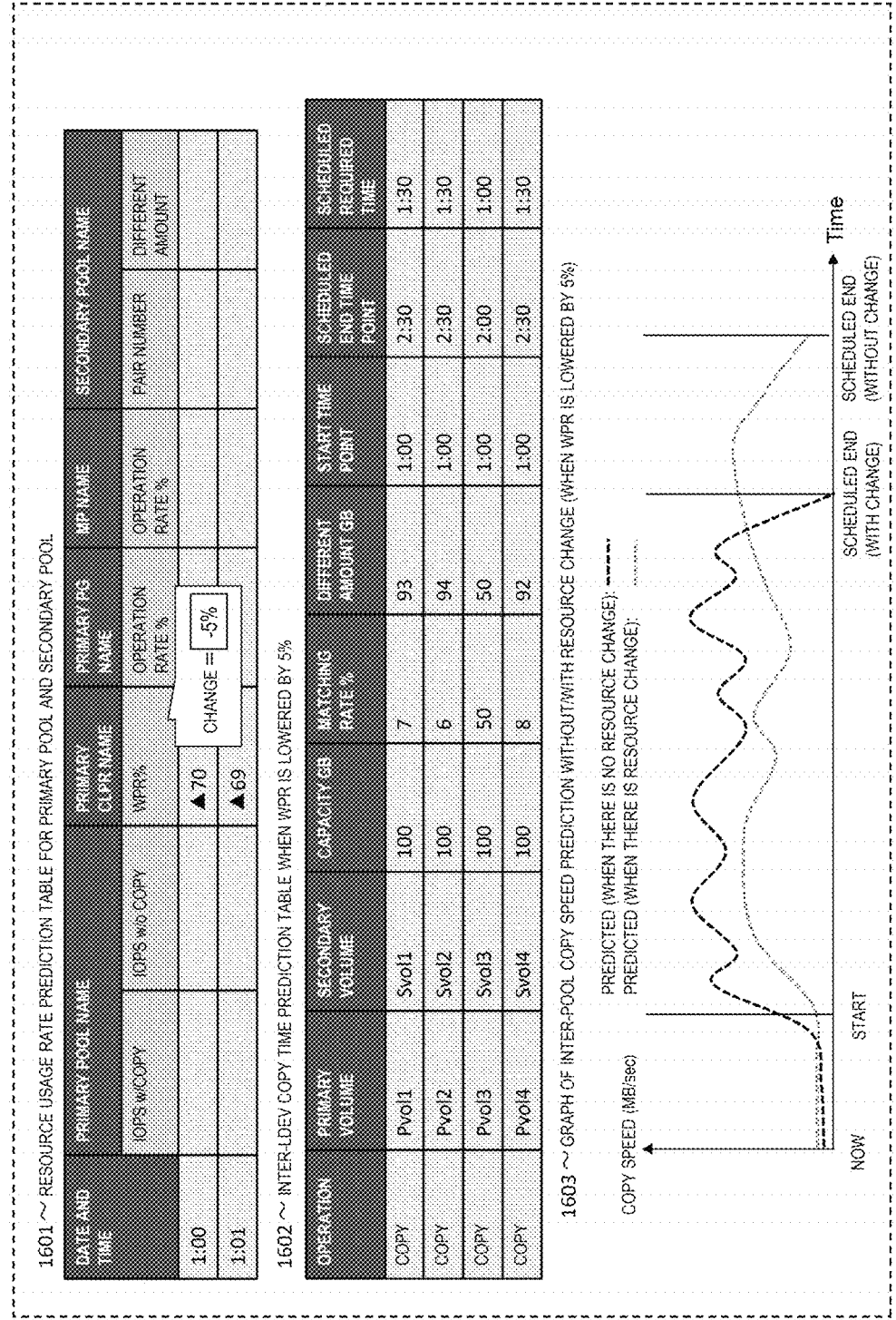
FIG. 18 is a diagram showing still another example of the display screen of the operation management system according to the embodiment.

FIGS. 16 to 18 are display examples of a graphical user interface (GUI) displayed on the dashboard of the BA 213 of the data transformation and data visualization server 208.

FIG. 16 shows an example of a copy time prediction GUI when a new pair is added.

A table 1401 shows an inter-LDEV copy time prediction result when the copy processing is added in the storage device 203. A graph 1402 shows predicted and measured inter-pool copy speeds when the copy processing is added in the storage device 203.

FIG. 17 shows an example of the copy time prediction GUI when the difference amount increases.

A table 1501 shows an inter-LDEV copy time prediction result when the difference amount increases. A graph 1502 shows predicted and measured inter-pool copy speeds when the difference amount increases.

FIG. 18 shows an example of the copy time prediction GUI when a resource amount is changed.

A table 1601 shows that since the resource usage rate (WPR of the CLPR) increases due to the trend prediction, a CLPR capacity is increased, and the copy speed is predicted by lowering the WPR by 5%. A table 1602 shows an inter-LDEV copy time prediction result when the WPR is lowered by 5%. A graph 1603 shows a result obtained by comparing a case where there is no resource change and a case where there is a resource change in the inter-pool copy speed, i.e., when the WPR is lowered by 5%.

FIG. 19 is the output tables 309 for displaying the GUI.

The output tables 309 include an inter-LDEV copy time display table 1701 and an inter-pool copy speed display table 1712.

The inter-LDEV copy time display table 1701 includes an operation 1702, a primary volume 1703, a secondary volume 1704, a capacity 1705, a matching rate 1706, a difference amount (measured) 1707, a difference amount (predicted) 1708, a start time point 1709, a scheduled end time point 1710, and a scheduled required time 1711.

The inter-pool copy speed display table 1712 includes a date and time 1713, a primary pool name 1714, a secondary pool name 1715, an IOPS w/o copy 1716 and an IOPS w/copy 1717 of the LDEV group in the primary pool, an inter-pool pair number 1718, an inter-pool difference amount 1719, a predicted inter-pool copy speed 1720, a predicted inter-pool copy speed (upper limit) 1721, a predicted inter-pool copy speed (lower limit) 1722, a measured inter-pool copy speed (copy IOPS of the LDEV group in the secondary pool) 1723, an in/out of prediction range 1724, a primary CLPR name 1725, a write pending rate 1726, an MPU name 1727, an MPU operation rate 1728, a primary PG name 1729, and a primary PG operation rate 1730.

According to the present embodiment configured in this way, it is possible to implement the operation management device and the operation management method capable of accurately predicting the inter-volume copy time.

According to the present embodiment, it is possible to detect the prolongation of the copy processing and the decrease in the IO processing performance before the execution of the copy processing. Further, in order to avoid a trouble of the copy processing, it is possible to estimate the copy time when a copy setting change or the resource usage rate is changed.

The embodiment described above has been described in detail for easy understanding of the invention, and the invention is not necessarily limited to those including all the configurations described above. A part of the configuration of the embodiment may be added to, deleted from, and replaced with another configuration.

A part or all of the configurations, functions, processing units, processing methods or the like described above may be implemented by hardware such as through design using an integrated circuit. Further, the invention can also be implemented by a program code of software that implements the functions of the embodiment. In this case, a storage medium in which the program code is recorded is provided to a computer, and a processor included in the computer reads out the program code stored in the storage medium. In this case, the program code itself read out from the storage medium implements the functions of the embodiment described above, and the program code itself and the storage medium storing the program code constitute the invention. As a storage medium for supplying such a program code, for example, a flexible disk, a CD-ROM, a DVD-ROM, a hard disk, a solid state drive (SSD), an optical disk, a magneto-optical disk, a CD-R, a magnetic tape, a nonvolatile memory card, and an ROM is used.

Further, the program code that implements the functions described in the present embodiment can be implemented in a wide range of programs or script languages such as assembler, C/C++, perl, Shell, PHP, and Java (registered trademark).

In the embodiment described above, a control line and an information line are considered to be necessary for description, and all control lines and all information lines are not necessarily shown in a product. All configurations may be connected to each other.

What is claimed is:

1. An operation management device configured to perform operation management on a storage device including a plurality of resources and a plurality of volumes,
    in the storage device, IO processing and copy processing being performed between a plurality of volume groups that store the plurality of volumes, the operation management device comprising:
    a processor, wherein
    the processor is configured to
    predict an inter-pool copy speed between the plurality of volume groups belonging to a same resource pool in the storage device, and
    predict an inter-volume copy time based on the predicted inter-pool copy speed.

2. The operation management device according to claim 1, wherein the processor is configured to predict the inter-pool copy speed based on an assumption that the inter-pool copy speed is equal in the plurality of volume groups in the same resource pool.

3. The operation management device according to claim 1, wherein
    the plurality of volume groups include a primary volume group and a secondary volume group that i) forms a copy pair with the primary volume group and ii) stores data of the primary volume group before the copy pair is formed.

4. The operation management device according to claim 1, wherein
    the processor is configured to calculate the inter-volume copy time between the plurality of volume groups belonging to the same resource pool in the storage device, by integrating, the predicted inter-pool copy speed, from i) a start time point of the copy processing between the plurality of volume groups to ii) an end time point at which a difference, amount between the plurality of volume groups, is reached.

5. The operation management device according to claim 1, wherein
    the processor is configured to predict the inter-pool copy speed by calculating a predicted value of measured data relating to past IO processing and the copy processing stored in the storage device, inputting the predicted value to a copy prediction model, and performing multiple regression analysis by the copy prediction model.

6. The operation management device according to claim 5, wherein
    the plurality of volume groups include a primary volume group and a secondary volume group that i) forms a copy pair with the primary volume group and ii) stores data of the primary volume before the copy pair is formed, and
    the processor is configured to
    use, as the measured data, an IOPS of the primary volume group, a usage rate of a resource, a pair number of the copy processing, a difference amount between the primary volume group and the secondary volume group, and a copy speed of the copy processing from the primary volume group to the secondary volume group,
    input, when the copy processing is added, a pair number of the added copy processing to the copy prediction model, and
    perform the multiple regression analysis by the copy prediction model by setting an objective variable as the copy speed and setting an explanatory variable as a value input to the copy prediction model wherein the explanatory variable is the IOPS of the primary volume group, the usage rate of the resource, the pair number of the copy processing, and the difference amount between the primary volume group and the secondary volume group.

7. The operation management device according to claim 1, wherein the processor is configured to predict the inter-pool copy speed by monitoring a difference amount between the plurality of volume groups, comparing a predicted difference amount with the difference amount prior to the copy processing, and correcting the predicted difference amount when a deviation between the predicted difference amount and the difference amount exceeds a threshold value.

8. The operation management device according to claim 5, wherein
the processor is configured to predict, before the copy processing is performed, the inter-pool copy speed by reducing a usage rate of a resource or a pair number of the copy processing, which is the predicted value, when an end time point exceeds a predetermined time and the usage rate of the resource exceeds a threshold value.

9. The operation management device according to claim 1, further comprising:
a display unit, wherein
the processor is configured to cause the display unit to display a predicted value and a measured value of the inter-pool copy speed.

10. The operation management device according to claim 7, further comprising:
a display unit, wherein
the processor is configured to cause the display unit to display a predicted value of the inter-pool copy speed when the predicted difference amount is corrected and a predicted value of the inter-pool copy speed when the predicted difference amount is not corrected.

11. The operation management device according to claim 8, further comprising:
a display unit, wherein
the processor is configured to cause the display unit to display a predicted value of the inter-pool copy speed when the usage rate of the resource or the pair number of the copy processing, which is the predicted value, is reduced, and a predicted value of the inter-pool copy speed when the usage rate of the resource or the pair number of the copy processing is not reduced.

12. An operation management method performed by an operation management device configured to perform operation management on a storage device including a plurality of resources and a plurality of volumes, wherein
in the storage device, IO processing and copy processing are performed between a plurality of volume groups that store the plurality of volumes,
the operation management device includes a processor, and
the processor is configured to
predict an inter-pool copy speed between the plurality of volume groups belonging to a same resource pool in the storage device, and
predict an inter-volume copy time based on the predicted inter-pool copy speed.

* * * * *